United States Patent
Huhn

(10) Patent No.: US 8,955,483 B2
(45) Date of Patent: Feb. 17, 2015

(54) VEHICLE WITH A VACUUM RESERVOIR

(71) Applicant: Dr. Ing. h.c. F. Porsche Aktiengesellschaft, Stuttgart (DE)

(72) Inventor: Werner Huhn, Bondorf (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 79 days.

(21) Appl. No.: 13/913,904

(22) Filed: Jun. 10, 2013

(65) Prior Publication Data

US 2013/0340699 A1 Dec. 26, 2013

(30) Foreign Application Priority Data

Jun. 21, 2012 (DE) .................. 10 2012 105 408

(51) Int. Cl.
*F02B 77/00* (2006.01)
*F01M 1/12* (2006.01)
*F02M 17/52* (2006.01)
*B60T 13/46* (2006.01)
*F01M 13/00* (2006.01)

(52) U.S. Cl.
CPC .................. *F02B 77/00* (2013.01); *F01M 1/12* (2013.01); *F02M 17/525* (2013.01); *B60T 13/46* (2013.01); *F01M 2001/126* (2013.01); *F01M 2013/0083* (2013.01); *F15B 2211/89* (2013.01)
USPC .................................. 123/184.21; 123/196 R

(58) Field of Classification Search
CPC ....... F02B 77/00; F02M 17/525; B60T 13/46; F01M 2001/126; F01M 2011/0083; F01M 13/00; F01M 2013/0083
USPC ..................................... 123/196 R
See application file for complete search history.

(56) References Cited

U.S. PATENT DOCUMENTS 3,842,931 A    10/1974  Andres
2011/0132311 A1*  6/2011  Pursifull et al. ......... 123/184.56

FOREIGN PATENT DOCUMENTS

| DE | 21 14 589 A | 10/1972 |
| DE | 37 31 597 A1 | 4/1988 |
| DE | 199 29 880 A1 | 1/2001 |
| DE | 101 39 141 A1 | 2/2003 |

OTHER PUBLICATIONS

Search Report from German priority application DE 10 2012 105 408.8, dated Feb. 1, 2013, with partial English translation.

* cited by examiner

*Primary Examiner* — Lindsay Low
*Assistant Examiner* — Jacob Amick
(74) *Attorney, Agent, or Firm* — RatnerPrestia

(57) ABSTRACT

A vehicle having an internal combustion engine and having a vacuum reservoir which is connected to at least one vacuum source and to a plurality of vacuum consumers, wherein the internal combustion engine includes a control device, an intake system with an intake line, and a crankcase, and wherein the vacuum reservoir is connected to the intake line and to the crankcase in such a way that both the intake system and also the crankcase serve as vacuum sources.

8 Claims, 1 Drawing Sheet

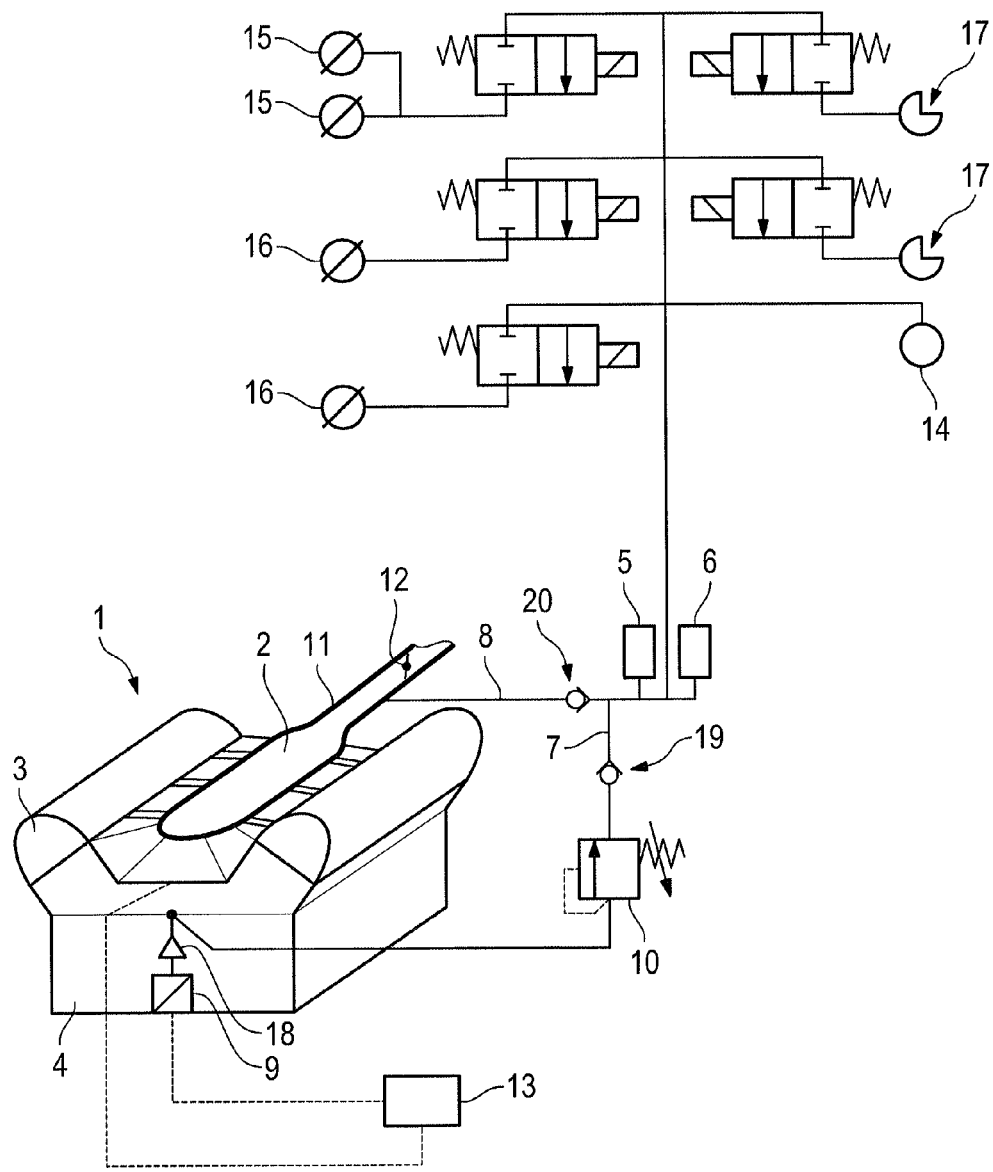

VEHICLE WITH A VACUUM RESERVOIR

CROSS-REFERENCE TO RELATED APPLICATIONS

This application claims priority to German Patent Application No. 10 2012 105 408.8, filed Jun. 21, 2012, which is incorporated by reference herein in its entirety.

FIELD OF THE INVENTION

The invention relates to a vehicle having an internal combustion engine and having a vacuum reservoir connected to at least one vacuum source and to a plurality of vacuum consumers, wherein the internal combustion engine comprises a control device, an intake system with an intake line, and a crankcase, characterized in that the vacuum reservoir is connected to the intake line and to the crankcase in such a way that both the intake system and also the crankcase serve as vacuum sources.

BACKGROUND OF THE INVENTION

In modern motor vehicles, it is increasingly common for switching and control elements to be pneumatically actuated, these generally being connected to a vacuum reservoir for this purpose. Such vacuum reservoirs are normally connected to the air intake system of the internal combustion engine, because a vacuum prevails there at certain operating points. Modern direct-injection Otto-cycle internal combustion engines are commonly operated without throttling, such that the provision of a vacuum for the vacuum reservoir is generally assisted by means of a vacuum pump.

SUMMARY OF THE INVENTION

Described herein is a vehicle with a vacuum reservoir such that the vacuum supply in the vehicle is improved.

The vehicle according to aspects of the invention is characterized in that the vacuum reservoir is connected to the intake line of the internal combustion engine and to the crankcase such that both the intake line and also the crankcase serve as vacuum sources.

According to aspects of the invention, the vacuum supply for the vehicle is realized by means of the vacuum prevailing in the intake system of the internal combustion engine in combination with the vacuum from the crankcase. In this way, it is possible to dispense with a vacuum pump driven by the internal combustion engine, such that more installation space is available for other components. Furthermore, the efficiency of the internal combustion engine is improved as a result of the fact that the power conventionally used for the vacuum pump is saved. Consequently, the vacuum supply concept according to aspects of the invention leads to reduced fuel consumption and thus to a reduction of $CO_2$ emissions.

In one refinement of the invention, a first vacuum line in which a vacuum regulation valve is arranged is provided between the crankcase and the vacuum reservoir. The vacuum regulation valve is preferably formed such that, by means thereof, for the protection of crankshaft sealing rings, a certain crankcase vacuum is not undershot. The vacuum in the crankcase is monitored, such that a connection to the environment is produced by means of the vacuum regulation valve if a certain crankcase vacuum is undershot. It is thus possible for the vacuum in the crankcase to be limited to a critical vacuum.

In a further refinement of the invention, a vacuum sensor connected to the control device is arranged in the first vacuum line or on the crankcase. The vacuum in the crankcase is measured and monitored by means of the vacuum sensor. If insufficient vacuum is present in the crankcase, it is possible by means of the control device for a throttle flap position to be adjusted such that an intensified vacuum prevails within the intake line in order to optimize the vacuum supply.

In a further refinement of the invention, the vacuum sensor is arranged on a connecting line in which an oil separation device is integrated, such that the vacuum sensor is protected against oil droplets or oil mist.

In a further refinement of the invention, a second vacuum line is provided between the intake line and the vacuum reservoir. The second vacuum line produces a connection between the vacuum reservoir and the intake line.

In one advantageous refinement of the invention, the vacuum reservoir is formed from a first vacuum reservoir as a main reservoir and a second vacuum reservoir as a reserve vacuum reservoir. A reserve reservoir is thus provided in the vehicle, such that in relatively high-altitude areas, where lower air pressure prevails, sufficient vacuum is present in the vehicle. This has the effect that for example a brake force assistance means which is connected to the vacuum reservoir has sufficient vacuum available. The safety of the vehicle is thus increased.

The present vacuum supply concept is based on the available vacuum in the engine being utilized by means of already-existing components without the need for an additional vacuum pump to be fitted. This results in a weight reduction of the vehicle, and the drive power of the omitted vacuum pump can be saved.

In a further refinement of the invention, the internal combustion engine is operated with a dry oil sump, such that, for the extraction of oil, at least one dry sump oil pump is arranged within the crankcase, by means of which at least one dry sump oil pump a vacuum is generated in the crankcase. This has the effect that the vacuum reservoir is supplied with sufficient vacuum, such that the number of vacuum consumers in the vehicle can be increased without the need for an additional vacuum pump for this purpose.

Further features and combinations of features will emerge from the description. Specific exemplary embodiments of the invention are illustrated in the single figure and are explained in more detail in the following description.

BRIEF DESCRIPTION OF THE DRAWING FIGURE

FIG. 1 is a schematic illustration of an internal combustion engine having a vacuum supply system for a vehicle (not illustrated) in which a plurality of vacuum consumers are supplied with vacuum.

DETAILED DESCRIPTION OF THE INVENTION

The internal combustion engine 1 comprises an intake system 2, a cylinder head 3 and a crankcase 4. The internal combustion engine 1 comprises a plurality of cylinders which are supplied with combustion air through the intake system 2. The intake system 2 has an intake line 11 and a throttle flap 12. When the throttle flap 12 is open, combustion air is sucked in from the environment. Depending on the position of the throttle flap 12, a vacuum prevails within the intake line 11.

The internal combustion engine 1 is operated with a dry oil sump, such that oil that has accumulated within the crankcase 4 is sucked in by at least one dry sump oil pump. A vacuum is thus likewise generated in the crankcase.

The vehicle (not illustrated) has a vacuum supply system which is formed from a first vacuum reservoir 5 and a second vacuum reservoir 6. Both vacuum reservoirs are connected to a plurality of vacuum consumers. For example, a brake force booster 14 is connected to the vacuum supply system. Further vacuum consumers, such as exhaust-gas flaps 14, resonance flaps 16 or disk valves 17 are likewise connected to the vacuum supply system. For the charging of the vacuum reservoirs 5 and 6 with vacuum, a first vacuum line 7 and a second vacuum line 8 are provided. The first vacuum line 7 is connected to the crankcase 4 of the internal combustion engine 1. The second vacuum line 8 is connected to the intake system 2, preferably to the intake line 11, wherein the connection point between the intake system 2 and the second vacuum line 8 is positioned downstream of the throttle flap 2.

According to aspects of the present invention, the first vacuum reservoir 5 serves as a main reservoir, while the second vacuum reservoir 6 serves as a reserve reservoir. The number of vacuum reservoirs may be increased depending on the number of vacuum end consumers connected to the vacuum supply system. Reserve vacuum reservoirs are provided for safety reasons, such that in the event of low ambient pressure, in particular in relatively high-altitude areas, there is always sufficient vacuum available in the vehicle, in particular for the purpose of brake force assistance.

In the first vacuum line 7 there is provided a vacuum regulation valve 10 by means of which the vacuum in the crankcase is controlled or regulated. The vacuum regulation valve 10 serves to limit the crankcase vacuum such that crankshaft sealing rings (not illustrated) arranged in the crankcase 4 are protected. Such crankshaft sealing rings can be damaged in the event of a very high vacuum in the crankcase 4. The vacuum regulation valve 10 35 produces a connection to the environment at a certain vacuum value, such that a critical vacuum value of within the crankcase within the crankcase 4 is avoided.

Furthermore, a vacuum sensor 9 is provided by means of which the vacuum in the crankcase 4 is determined. The vacuum sensor 9 is connected to a control device 13 of the internal combustion engine 1, to which control device the present vacuum value in the crankcase 4 is transmitted. Between the vacuum sensor 9 and the crankcase 4 there is provided an oil separation device 18 for protecting the vacuum sensor 9 against oil droplets or oil mist. Furthermore, in each case one check valve 19 and 20 is provided within the first vacuum line 7 and within the vacuum line 8.

During the operation of the internal combustion engine 1, air is sucked in from the environment through the intake line 11 when the throttle flap 12 is open. The throttle flap 12 is normally actuated by means of an actuating motor (not illustrated) which is connected to the control device 13. During throttled operation of the internal combustion engine 1, a vacuum prevails within the intake line 11 downstream of the throttle flap 12. The pressure reservoirs 5 and 6 are supplied with the vacuum within the intake line 11 through the second vacuum line 8. The vacuum reservoirs 5 and 6 serve for providing a vacuum for the vacuum consumers 14, 15, 16 and 17. For example, air flows from the brake force booster 14 to the vacuum reservoirs 5 and 6. If, at such a time, the internal combustion engine is operated without throttling, such that a vacuum does not prevail in the intake line 11, the vacuum reservoirs 5 and 6 can be supplied with vacuum from the crankcase 4. Here, the vacuum sensor 9 monitors the present value of the vacuum in the crankcase 4. If, at such a time, insufficient vacuum is present in the crankcase 4, then by means of the control device 13, either a dry sump oil pump is triggered so as to generate an increased vacuum in the crankcase 4, or the throttle flap 12 is adjusted such that a sufficient vacuum is generated in the intake line 11.

In the present vacuum supply system according to aspects of the invention, components already present in the internal combustion engine 1 are used without the need for an additional vacuum pump. This leads to a weight reduction and to improved fuel consumption of the vehicle.

What is claimed:

1. A vehicle having an internal combustion engine and having a vacuum reservoir which is connected to at least one vacuum source and to a plurality of vacuum consumers,
   wherein the internal combustion engine comprises a control device, an intake system with an intake line, and a crankcase,
   wherein the vacuum reservoir is connected to the intake line and to the crankcase in such a way that both the intake system and the crankcase serve as vacuum sources.

2. The vehicle as claimed in claim 1, wherein a vacuum regulation valve is arranged within a first vacuum line, and wherein the first vacuum line is provided between the crankcase and the vacuum reservoir.

3. The vehicle as claimed in claim 2, wherein the vacuum regulation valve is designed such that, by means thereof, for the protection of crankshaft sealing rings, a certain crankcase vacuum is not undershot or exceeded.

4. The vehicle as claimed in claim 2, wherein a vacuum sensor connected to the control device is arranged in the first vacuum line or on the crankcase.

5. The vehicle as claimed in claim 4, wherein the vacuum sensor is arranged on a connecting line in which an oil separation device is integrated.

6. The vehicle as claimed in claim 2, wherein a second vacuum line is provided between the intake line and the vacuum reservoir.

7. The vehicle as claimed in claim 1, wherein the vacuum reservoir is formed from a first vacuum reservoir as a main reservoir and a second vacuum reservoir as a reserve reservoir.

8. The vehicle as claimed in claim 1, wherein, for the extraction of oil, at least one oil pump is arranged within the crankcase, by means of the at least one oil pump, a vacuum can be generated in the crankcase.

* * * * *